Nov. 26, 1968   M. S. FLOWER ET AL   3,412,481
FLIGHT TRAINING APPARATUS
Filed May 1, 1964                    3 Sheets-Sheet 1

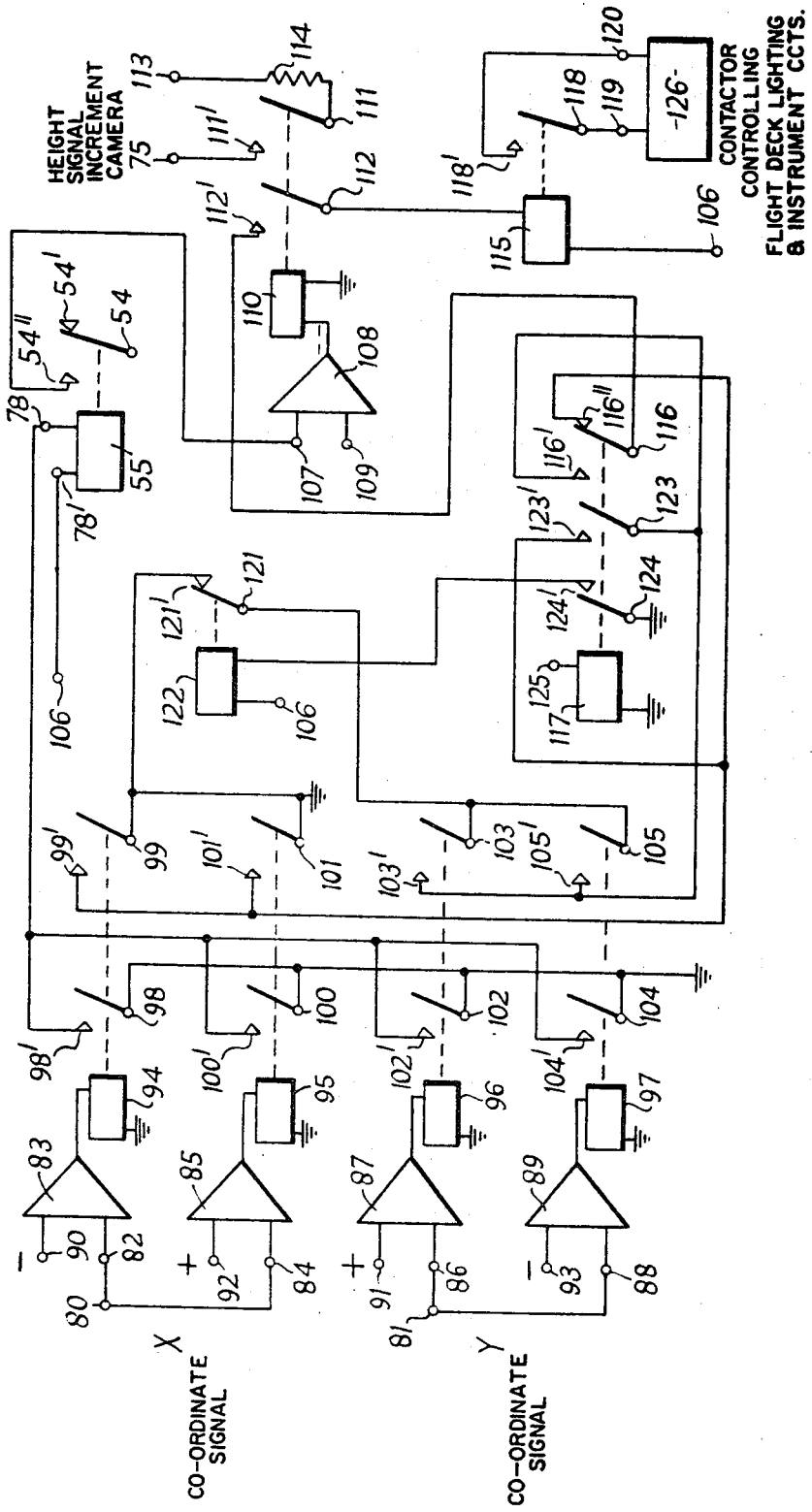

United States Patent Office 3,412,481
Patented Nov. 26, 1968

3,412,481
FLIGHT TRAINING APPARATUS
Maurice Shirley Flower, Forest Row, Sussex, and Roy Alfred George Gasson, Tilgate, Crawley, Sussex, England, assignors to Communications Patents Limited
Filed May 1, 1964, Ser. No. 364,221
Claims priority, application Great Britain, July 1, 1963, 26,007/63
1 Claim. (Cl. 35—12)

ABSTRACT OF THE DISCLOSURE

This invention provides height determining apparatus for use in conjunction with ground-based flight training equipment of the kind in which visual effects corresponding to the view seen by the crew of an actual aircraft are simulated, using a movable television camera to view a model of the ground and a television receiver to provide the scene presented to the trainee crew.

The height determining apparatus incorporates electromechanical means actuated by a mechanical member to provide a signal which varies with altitude, when the mechanical member is in contact with the surface of the model. When this first signal equals a second signal, corresponding to the height above ground of the pilot's viewpoint, the first signal is fed to means by which this height of the camera above the model is maintained.

The electromechanical apparatus may also be actuated by a second mechanical member, to provide a signal for feeding to electrical computing means in which the limits of a simulated runway of the model are defined. The computing means arrests the camera, if contact is made by the second mechanical member with simulated objects, located external to the simulated runway area, so that crash conditions may be simulated.

---

This invention relates to ground-based flight training apparatus in which visual effects are simulated corresponding to the view seen by the crew of an aircraft during actual flight, and in particular to apparatus in which the simulated view of a runway and surrounding objects can be modified so that the different views from aircraft of different sizes may be represented.

In modern flight training, use is made of flight simulators of the type which provides a visual presentation of objects seen from the flight deck of an aircraft during low altitude phases of a flight, in addition to providing instruments responsive to settings of the flight and engine controls of the aircraft simulated.

Visual systems capable of providing a high degree of realism advantageously employ a television camera to view a detailed scale model. The scene presented to the trainee crew is then provided by a television receiver fed with signals from the television camera. The camera is movable relatively to the model, so that the view presented of the external objects provided in the model changes correspondingly to the simulated movements of the aircraft.

The appearance of surrounding objects, as seen by the pilot from an aircraft which is on or near the ground, differs greatly according to the size of the aircraft, because the height of the eye level of the pilot above the landing wheels of the aircraft differs greatly with the type of aircraft. For example, in an airliner, the pilot's eye level may be 18 feet above the runway when the aircraft is in contact with the runway but in a single seat aircraft, his eye level may only be 8 feet from the runway, in the same circumstances.

In actual flying, it is important that the ground and external objects ahead of an aircraft should be visible to the pilot during take-off and landing operations, so that the pilot may be able to judge correctly the instant at which the aircraft should commence to climb during take-off, or make contact with the runway on landing.

It is desirable, therefore, that the view of the runway and surrounding objects provided in a visual flight simulator should correspond to the view that would be seen by the pilot of an actual aircraft of the type represented by the simulator. That is to say, the simulated height above ground of the viewpoint of the pilot of the simulator and the actual height above ground of the viewpoint of the pilot of an aircraft of corresponding type should be substantially the same.

During actual take-off or landing operations, a situation may arise where an aircraft accidentally comes into contact with an object on the ground and makes a crash landing, in spite of the pilot's efforts to take avoiding action. It is desirable, therefore, that effects should be provided in a visual flight simulator to resemble such abnormal conditions.

It is an object of one form of the present invention to provide, in ground-based flight training and visual simulating apparatus, means whereby the simulated height above ground of the viewpoint provided by the apparatus during "on ground" conditions can be made to correspond to the height above ground of the viewpoint of the pilot of an actual aircraft of the type simulated.

It is a further object of another form of the invention to provide, in similar apparatus, means whereby contact with simulated external objects may be detected.

Accordingly, this invention provides ground-based flight training apparatus, including apparatus for simulating visual effects corresponding to the simulated flight of an aircraft, or simulated movement of the aircraft on the ground, comprising a three-dimensional representation of the surface of the earth, a camera moved relatively to the said representation for viewing at least a portion of the said representation, electromechanical means moved correspondingly to the camera relative movement having at least one mechanical member for displacement by contact with the said representation, the said electromechanical means providing an electric signal, according to the displacement of the said mechanical member, by which the "height" of the camera above the said representation is maintained at a pre-determined value.

As the actual orientation of the representation and camera is arbitrary, for example the representation may be mounted so that the earth's surface is actually in a vertical plane, the term "height" in the preceding paragraph is relative to the surface of the representation.

One form of the invention provides ground-based flight training apparatus as defined in the preceding paragraph in which the said electromechanical means has a second mechanical member, the said electromechanical means providing an electric signal so that the relative movement of the camera is arrested if the said second mechanical member makes contact with an object provided in the said representation.

In the preceding paragraphs and in the appended claims the term "representation of the surface of the earth" is to be understood in a broad sense, since the representation may be an aircraft carrier flight deck together with the surrounding sea features.

In order that the invention may be more readily carried into effect, an embodiment which combines both forms of the invention will now be described, by way of example, with reference to the accompanying drawings, in which:

FIG. 1a shows, in diagrammatic form, an end view of the electromechanical apparatus of FIG. 1;

Figure 1:
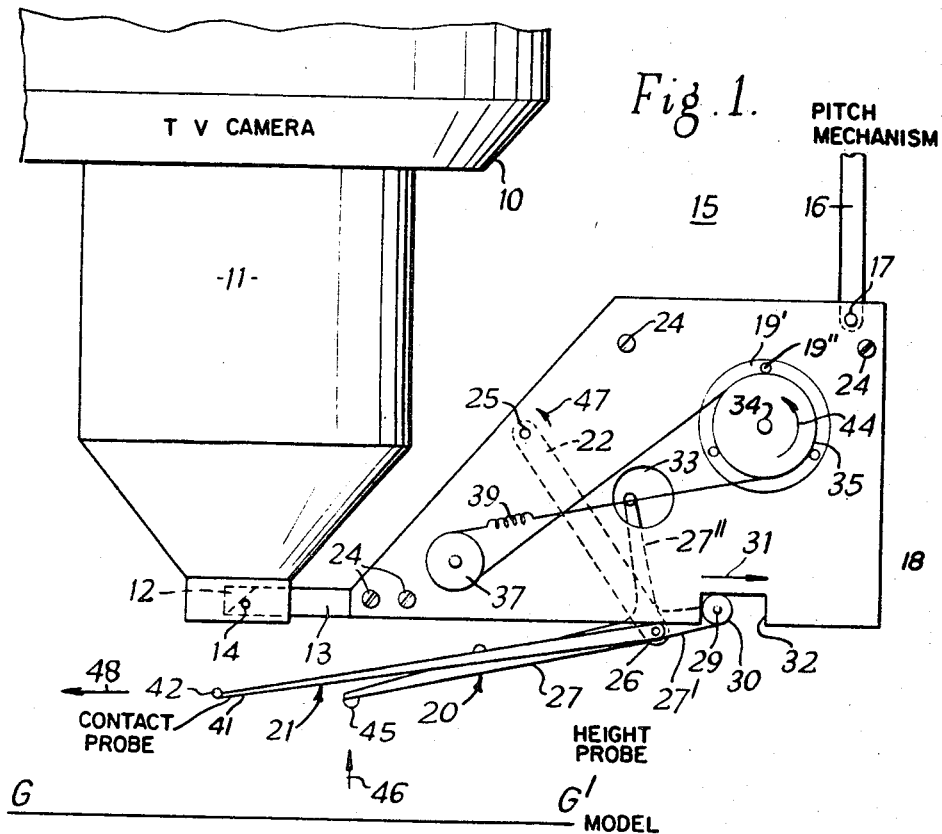
FIG. 1 shows, in diagrammatic form, a side elevation of an electromechanical apparatus and a portion of the camera of a visual flight simulator.
Figure 2:
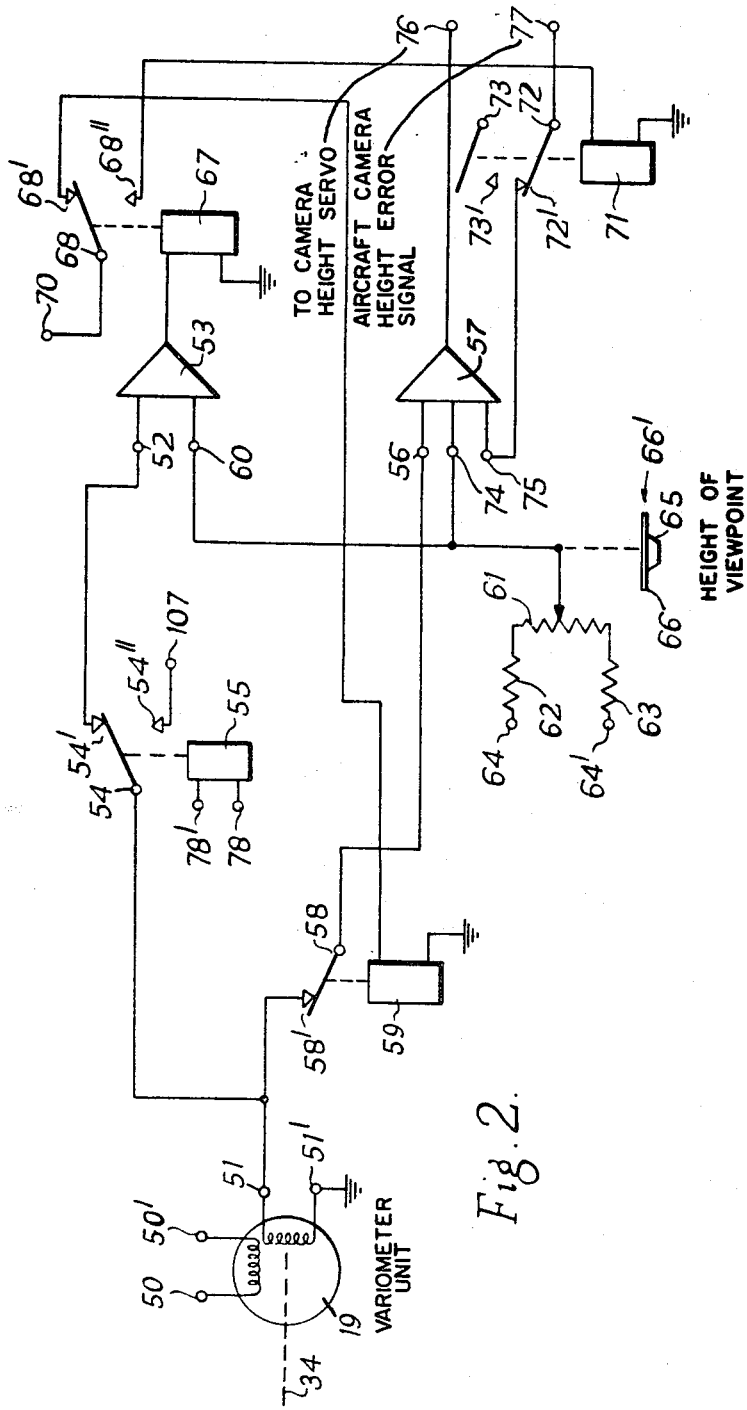

FIG. 2 is a schematic diagram showing the essential elements of a computing system for association with the apparatus of FIG. 1, by which the simulated height above ground of the viewpoint of the pilot of the simulator may be controlled; and FIG. 3 is a schematic diagram showing the essential elements of a computing system for association with the electromechanical apparatus of FIG. 1, by which accidental contact with simulated objects provided in the model may be detected.

In a preferred form of visual flight simulator, an aircraft and the ground are represented by a camera and a model respectively. In FIG. 1, part of the body of the camera of a visual flight simulator is shown, which is indicated in the diagram by the reference number 10. The lens system of the camera is carried on a mount 11 attached to the body of the camera. The lens system views a model, represented by the line G–G', in a direction generally along the length of the model, by way of a reflecting prism 12, and provides within the camera an image of a portion of the model.

The prism 12 is attached to a movable support 13 which is mounted between pivots to rotate about an axis at right angles to the line G–G' and parallel to the plane of the model, in a manner to enable pitching effects to be simulated. One pivot 14 is shown in the drawing.

The support 13 is attached to an electromechanical unit, indicated generally at 15, and is rotated by mechanism, not shown, which is coupled to the unit 15 by a link 16, via a bearing 17, part only of the link being shown in the drawing.

In FIG. 1a, the electromechanical unit 15 and its parts are indicated by the same reference numbers as in FIG. 1.

Referring to FIGS. 1 and 1a, the electromechanical unit 15 comprises plates 18 and 18', forming the body of the unit, a variometer unit 19, a height probe 20, a contact probe 21 and supporting links 22 and 22', of flat strip-like form, by which the height and contact probes are suspended from the body of the unit.

The surfaces of the plates 18 and 18' are parallel to one another and are spaced apart by the support 13 and two spacers, one of which is shown in FIG. 1a and is indicated by the reference number 23. The plates are clamped with the support and spacers between them by four screws 24 which pass through clearance holes in the plate 18, through clearance holes in the support and spacers, into threaded holes in the plate 18'. The plates 18 and 18' are assembled on the support 13, so that the surfaces of the plates are perpendicular to the surface of the model.

The supporting links 22 and 22' are spaced apart and are mounted between the plates 18 and 18' in a manner to rotate about a shaft 25. The shaft 25 is supported by the plates 18 and 18' with its axis parallel to the surface of the model. The shaft 25 passes through a bearing hole, not shown, near to one extremity of each of the supporting links. The height and contact probes 20 and 21 are supported by a shaft 26 which passes through a hole near to the other extremity of each of the supporting links. The shaft 26 is engaged by a bearing 28 in the height probe and by bearing holes in members of the contact probe. The axes of shafts 25 and 26 are parallel to one another and to the surface of the model.

The height probe 20 has three flat strip-like members 27, 27' and 27". The member 27 has a length approximately four times that of the member 27'. The centreline of the member 27" is at right angles to a common centreline of the members 27 and 27'.

The bearing 28 is located at the junction of the centrelines of the members 27, 27' and 27" and engages the shaft 26 between the spaced supporting links 22 and 22'.

Attached to the extremity of the member 27' is a shaft 29, upon which rollers 30 and 30' are mounted to rotate freely. The axis of the shaft 29 is parallel to the axes of the shafts 25 and 26. The plates 18 and 18' each have a rectangular slot in one edge, the longer sides of the slots providing a track for the rollers 30 and 30' to enable the shaft 29 to move in the direction of the arrow 31. One slot in an edge of the plate 18 is shown in FIG. 1, and is indicated by the reference number 32.

The members 27" has a right angle bend at a distance from the bearing 28 approximately equal to the length of the member 27'. The extremity of the member 27" projects through a hole 33 in the pate 18. The hole 33 is of a diameter such that the probe 20 may be rotated about the shaft 26 through an angle of approximately 30 degrees.

The body of the variometer unit 19 is attached to the plate 18 by screws 19" and a clamping ring 19' to permit the stator of the variometer unit 19 to be set to a desired angular position. The plate 18' has a clearance hole, not shown, through which the rear of the body of the variometer unit projects to provide access to terminals 50, 50', 51 and 51'. The plate 18 has a clearance hole, not shown, through which a shaft 34 of the variometer unit 19 projects. Attached to the shaft 34 is a grooved pulley 35. A stub shaft 36, attached to the plate 18, carries a grooved loose pulley 37. The axes of the shafts 34 and 36 are perpendicular to the surface of the plate 18.

The pulleys 35 and 37 are coupled by a crossed loop 38 of fine cord. A helical spring 39 is included in the loop, so that the cord is maintained in a state of tension and in contact with the grooves of the pulleys. One point of the loop 38 is attached by a clamp 40 to the extremity of the member 27". The lengths of the links 22 and 22' and the positions of the shafts 25, 34 and 36 in the plates 18 and 18' are such that the cord is approximately at right angles to the centre-line of the member 27" and the point of attachment is approximately midway between the centres of the shafts 34 and 36. The tension of the cord is sufficient to support the load due to the probes 20 and 21, without appreciable sag in that run of the loop which is clamped to the member 27".

The contact probe has two similar flat tapered members 41 and 41', the lengths of which are approximately five times the length of the member 27' of the height probe 20. Each member has a bearing hole near to its wider extremity which engages a portion of the shaft 26 near to one of its extremities. For this purpose, the shaft 26 has a length such that portions of the shaft project from outer surfaces of the links 22 and 22'. The members 41 and 41' are coupled together so as to lie approximately parallel to one another, by a wire bar 42, soldered to the narrower extremity of each member, and by a wire bar 43, soldered to the middle of each member. The wire bar 43 rests on the member 27 of the height probe 20. The height and contact probe mechanism is operated to rotate the shaft 34, in the direction of the arrow 44, in a manner which will now be described.

Let it be assumed that a simulated flight is taking place and that the height of the camera 10 above the model G–G' is decreasing, corresponding to an aircraft approaching a runway for the purpose of effecting a landing. The distance between the camera and the model decreases progressively, so that a shoe 45, attached to the extremity of the member 27 of the height probe, eventually makes contact with the surface of the model. When this occurs the shoe 45 is displaced towards the camera 10, in a direction indicated by the arrow 46 and the height probe 20 is rotated about the shaft 26 through a small angle.

The cord 38, attached to the member 27", is moved in a direction from left to right in FIG. 1, to produce a rotation of the pulley 35 and shaft 34 in a direction indicated by the arrow 44. The shaft 34 is rotated by an amount which is determined by the height at which the shoe 45 first makes contact with the surface of the model and the height at which the camera ceases to approach the model, corresponding to the computed height above ground of the pilot's viewpoint, by the relative lengths of the members 27, 27" and by the diameter of the pulley 35. The links 22 and 22' rotate about the shaft 25, through a small angle, in a direction indicated by the arrow 47, so that the rollers 30 and 30' remain in contact with the tracks within the slots in the plates 18 and 18'.

The manner in which the height of the camera above the model is computed is described in detail later in the specification.

Let it be assumed that a simulated flight is taking place near to the surface of the ground and that an emergency arises corresponding to a condition where an aircraft comes into contact with an object on the ground. The camera is moving over the surface of the model, generally in a direction indicated by the arrow 48, so that the bar 42, representing approximately the distance between the wingtips of an aircraft, comes into contact with an object on the surface of the model. The bar 42 moves in a direction opposite to that indicated by the arrow 48 so that the shaft 29 moves in the direction indicated by the arrow 31. Hence the run of the cord 38, to which member 27" is attached, moves from left to right in FIG. 1 and the shaft 34 is rotated in the direction indicated by the arrow 44. As a result of this rotation the camera may be brought to rest to represent a crash.

The manner in which the camera is brought to rest so that conditions corresponding to a crash may be simulated is described later in this specification.

In FIG. 2 the variometer unit 19 and its parts are indicated by the same reference numbers as in FIG. 1. Referring to FIG. 2, the variometer unit 19 has a stator winding, connected to terminals 50 and 50' and a rotor winding connected to terminals 51 and 51'. Terminals 50 and 50' are connected to a source of supply of alternating current, not shown, which also provides signal current to the computing system of the flight simulator. The stator of the variometer unit 19 is orientated with respect to the mechanism of the unit 15, FIG. 1, so that the output voltage across the terminals 51 and 51' is directly proportional to the height above ground of the viewpoint.

The signal output provided at terminal 51 is fed to a first input terminal 52 of a switching amplifier 53, via contacts 54 and 54' of a relay 55 and to a first input terminal 56 of a servo amplifier 57, via contacts 58 and 58' of a relay 59. The relay 55 has changeover contacts 54, 54' and 54" and, under normal conditions of take-off and landing, the coil of the relay is de-energised so that the contacts 54 and 54' are closed. In FIG. 2 the contacts of the relays are shown in the positions assumed with the coils of the relays de-energised, The coil of the relay 55 is connected via terminals 78 and 78' to the computing system to be described with reference to FIG. 3. The contact 54" is connected to a terminal 107 which is part of the computing system of FIG. 3. The contact 58 and 58' of the relay 59 are open when the coil of the relay is energised.

The summing amplifier 53 has a second input terminal 60 which is connected to the wiper of a potentiometer 61. The winding of the potentiometer 61 is connected via resistors 62 and 63 to terminals 64 and 64', which are connected to the same source of supply as terminals 50 and 50'. The values of the resistors 62 and 63 are such that the maximum and minimum values of the output voltage from the wiper of the potentiometer 61 correspond respectively to the maximum and minimum heights of the viewpoint it is desired to stimulate. The height of the viewpoint is set to the desired value by a manual control knob 65, which is mechanically coupled to the wiper of the potentiometer 61. The knob 65 has a dial 66 with a graduated scale which is set with respect to an index 66'. The relative values of the voltages provided from the wiper of the potentiometer 61 and from the rotor winding of the variometer unit 19 are such that the heights represented by these voltages have the same scale.

The voltage fed to input terminals 52 and 60 of the switching amplifier 53 are of opposite phase relationship. The amplifier 53 is adjusted so that current is provided to energise the coil of a relay 67, connected to the output of the amplifier, if the values of the voltages fed to terminals 52 and 60 are substantially equal.

The relay 67 has changeover contacts 68, 68', 68". The contact 68 is connected to a terminal 70 of a direct current source of supply, not shown in the drawing. The contact 68' is connected to the coil of the relay 59 and the contact 68" to the coil of relay 71. The contacts 68 and 68' are open and the contacts 68 and 68" are closed when the coil of the relay 67 is energised. The relay 71 has two sets of contacts 72, 72' and 73, 73'. The contacts 72, 72' are open and the contacts 73, 73' are closed when the coil of the relay 71 is energised. The contacts 73 and 73' are part of the "on ground" computing system of the flight simulator, which is not shown in the drawing.

The amplifier 57 has a second input terminal 74, which is connected to the wiper of the potentiometer 61, and a third input terminal 75, which is connected, via the contacts 72 and 72' of the relay 71, to a terminal 77 of the camera and aircraft height computing systems of the simulator, which are not shown in the drawing. The output of the amplifier 57 is fed to a terminal 76 of a servo system, not shown, which controls the height of the camera above the surface of the model of the visual simulator.

Let it be assumed that a simulated flight is in progress and that the height of the camera 10, FIG. 1, above the model is decreasing, corresponding to an aircraft approaching a runway for the purpose of effecting a landing. The value of the voltage fed to terminal 52 is greater than the value of the opposing voltage fed to terminal 60. The coil of the relay 67 is de-energised, therefore the coil of relay 59 is energised, via closed contacts 68 and 68' of the relay 67 and the output voltage from the rotor of the mariometer unit 19 is not fed to the input terminal 56 of the amplifier 57. The coil of the relay 71 is de-energised and the contacts 72 and 72' are closed. An error signal, provided by the height computing systems of the simulator, is fed via closed contacts 72 and 72' to the input terminal 75 of the amplifier 57. This error signal is a voltage which represents, at any instant of time, the difference between the height of the aircraft computed by the height computing system of the flight simulator and the height represented by the height of the camera above the surface of the model. Thus the camera takes up a position corresponding to the height computed by the height computing system plus the height represented by the setting of the potentiometer 61.

The height of the camera above the model decreases progressively so that the shoe 45 of the height probe 20, FIG. 1, eventually comes into contact with the surface of the model, the shaft of the variometer 19 is rotated and the value of the voltage fed to the input terminal 52 of the amplifier 53 is progressively reduced. At the instant of time from the value of the voltages fed to terminals 52 and 60 become substantially equal, the switching amplifier 53 operates, the coil of the relay 67 is energised, the contacts 68 and 68" are closed and the contacts 68 and 68' are opened.

With the relay 67 operated, the coil of the relay 71 is energised, the contacts 72 and 72' are open and the height error signal provided at terminal 77 is no longer fed to the input terminal 75 of the amplifier 57. The contacts 73 and 73' are closed so that "on ground" conditions are established in the computer of the flight simulator.

With the relay 67 operated the coil of the relay 59 is de-energised, the contacts 58 and 58' are closed and the output voltage provided at terminal 51 of the rotor of the variometer unit 19 is fed to the input terminal 56 of the amplifier 57. The voltages fed to the input terminals 56 and 74 are of opposite phase relationship, hence, the servo system connected to the output of the amplifier 57 comes to rest when the voltages fed to the input terminals 56 and 74 are substantially of equal value, so that the height of the camera above the surface of the model corresponds to the height indicated by the dial and index 66 and 66'.

As the camera moves over the simulated runway, any variations in the level of the surface of the model are followed by the shoe 45, FIG. 1, so that the camera is maintained at a substantially constant height above that part of the model with which the shoe 45 is in contact. Thus the necessity for accurate levelling of that part of the model which represents the runway may be avoided.

In the simulator, it is assumed that a crash takes place if the aircraft comes into contact with an area of the model other than that which represents the runway. It is therefore necessary to define the limits of the simulated runway.

In FIG. 3 the terminal 75 and the relay 55 and its contacts are indicated by the same reference numbers as in FIG. 2. Referring to FIG. 3, the position of the simulated aircraft with respect to the surface of the model is represented by X and Y D.C. coordinate voltages derived from apparatus associated with the camera movement system, not shown, connected to terminals 80 and 81 respectively. It is assumed that the X and Y coordinate voltages are zero when the camera is at a position corresponding to the ideal point of touchdown on a rectangular runway, midway between the sides of the runway. It is also assumed that the centre line of the runway lies due east and west and that the direction of approach for landing is from the west.

The value of the X coordinate voltage represents the distance along this coordinate from the ideal point of touchdown, the polarity of this voltage being positive and negative at positions to the west and to the east of this point respecively. The value of the Y coordinate voltage represents the distance along this coordinate from the ideal point of touchdown, the polarity of this voltage being negative and positive at positions to the north and south of this point respectively.

The X coordinate voltage is fed to an input terminal 82 of a switching amplifier 83 and to an input terminal 84 of a switching amplifier 85. The Y coordinate voltage is fed to an input terminal 86 of a switching amplifier 87 and to an input terminal 88 of a switching amplifier 89. A bias voltage of negative polarity is fed to an input terminal 90 of the switching amplifier 83 and to an input terminal 93 of the switching amplifier 89. A bias voltage of positive polarity is fed to an input terminal 92 of the switching amplifier 85 and to an input terminal 91 of the switching amplifier 87.

In this example, the value of the negative bias voltage fed to terminal 90 corresponds to the distance between the ideal point of touchdown and the boundary of the runway in a westerly direction. The value of the postive bias-voltage fed to terminal 92 corresponds to the distance between the ideal point of touchdown and the boundary of the runway in an easterly direction.

The value of the positive bias voltage fed to terminal 91 corresponds to the distance from the centre to the northerly side of the runway and the value of the negative bias voltage fed to terminal 93 corresponds to the distance from the centre to the southerly side of the runway.

The outputs of the switching amplifiers 83, 85, 87, and 89 are fed to the coils of relays 94 to 97 respectively. The amplifier 83 is adjusted so that the coil of the relay 94 is energised if the X coordinate voltage applied to terminal 82 is of positive polarity and its value exceeds that of the bias voltage fed to terminal 90. The amplifier 85 is adjusted so that the coil of relay 95 is energised if the X coordinate voltage applied to terminal 84 is of negative polarity and its value exceeds that of the bias voltage fed to the terminal 92.

The amplifier 87 is adjusted so that the coil of the relay 96 is energised if the Y coordinate voltage applied to terminal 86 is of negative polarity and its value exceeds that of the bias voltage fed to terminal 91. The amplifier 89 is adjusted so that the coil of relay 97 is energised if the Y coordinate voltage applied to terminal 88 is of positive polarity and its voltage exceeds that of the bias voltage fed to terminal 93. Hence, the coils of relays 94 to 97 are de-energised if the simulated aircraft is within the runway area.

The relay 94 has two sets of make contacts, 98, 98' and 99, 99'. The relay 95 has two sets of make contacts 100, 100' and 101, 101'. The relay 96 has two sets of make contacts 102, 102' and 103, 103' and the relay 97 has two sets of make contacts 104, 104' and 105, 105'. The contacts 98, 100, 102 and 104 are connected together and to chassis, and the contacts 98', 100', 102' and 104' are connected together and to terminal 78 of the relay 55, FIG. 1. Terminal 78' of the relay 55 is fed with direct current from a source of supply not shown, connected to terminal 106. In FIG. 3 the contacts of the relays are shown in the positions assumed with the coils of the relays de-energised.

Contact 54" of the relay 55 is connected to a first input terminal 107 of a switching amplifier 108. A bias voltage is fed to a second input terminal 109 of the switching amplifier 108 from an alternating current source of supply which is not shown in the diagram.

If the simulated aircraft is in flight at a position where its X and Y coordinates do not lie within the runway area, the contacts of at least one of the relays 94 to 97 are closed, the coil of the relay 55 is energised and the contacts 54 and 54" are closed. With the contacts 54 and 54" closed, the output voltage from the rotor of the variometer unit 19, FIG. 1, is fed to the input terminal 107 of the amplifier 108. The voltages fed to the terminals 107 and 109 are of opposite phase relationship and the switching amplifier 108 is adjusted so that the coil of a relay 110 is energised if these voltages are of substantially the same value. The value of the voltage fed to terminal 107 is greater than the value of the bias voltage fed to terminal 109 unless the contact probe 21 or the height probe 20, FIG. 1, come into contact with an object on the surface of the model. When this occurs, the value of the voltage across the rotor of the variometer unit 19 is progressively reduced until the amplifier 108 operates and the coil of relay 110 is energised.

The relay 110 has two sets of make contacts 111, 111', and 112, 112'. The contact 111 is connected via resistor 114 to a terminal 113 of a source of supply of alternating current, not shown, which also provides signal current to the computing system of the associated flight simulator. The contact 111' is connected to the terminal 75 of the servo amplifier 57, FIG. 2. The voltage fed to terminal 75 has a phase relationship so that the camera moves away from the surface of the model by a small amount when the contacts 111, 111' are closed. The contact 112 is connected to the coil of a relay 115 which is fed with current from the source of supply connected to the terminal 106. The relay 115 has one set of make contacts 118, 118', connected to terminals 119 and 120 respectively of a contactor 126, which controls the lighting and instrument circuits of the flight deck of the simulator and circuits providing motion to the camera, which are not shown in the drawing.

A relay 117 has one set of make contacts 123 and 123', one set of break contacts 124 and 124' and one set of changeover contacts 116, 116' and 116".

The contact 116' is connected to contacts 103' and 105' of the relays 96 and 97. The contact 116" is connected to contacts 99' and 101' of the relays 94 and 95. The contacts 99 and 101 of the relays 94 and 95 are connected together and to chassis. The contacts 103 and 105 of the relays 96 and 97 are connected together and to chassis, by way of break contacts 121 and 121' of a relay 122.

The contact 123 is connected to the contacts 103' and 105', and the contact 123' is connected to the contacts 99' and 101'. The coil of the relay 122 is connected to the contact 124' and to the source of supply connected to terminal 106. Current is fed to the coil of the relay 122 when the contacts 124 and 124' are closed, the contact 124 being connected to ground.

The coil of the relay 117 is connected to a terminal 125 of the "in flight" circuit of the flight simulator, which is not shown in the drawing. The coil of the relay 117 is energised when the simulated aircraft is airborne. With the relay 117 energised, the contacts 124 and 124' are open and the coil of the relay 122 is de-energized. The contacts 103 and 105 of the relays 96 and 97 are connected to chassis via the closed contacts 121 and 121'.

Let it be assumed that a simulated flight is taking place in which the camera is moving over a part of the model which is not directly above the runway area. One or two of the relays 94 to 97 may be operated according to the simulated position of the aircraft with respect to the runway. In this example, it is assumed that the simulated flight is taking place over an area to the north of the runway.

The coil of the relay 96 is energised and the contacts 102, 102' and 103, 103' are closed. The coil of the relay 55 is energised via the closed contacts 102, 102', hence the contacts 54, 54" are closed and the output voltage from the rotor of the variometer unit 19, FIG. 2, is fed to the input terminal 107 of the switching amplifier 108.

Let the height of the camera above the surface of the model be reduced gradually so that the bar 42, FIG. 1, eventually comes into contact with an object on the surface of the model. The value of the voltage fed to terminal 107 is progressively reduced until its value becomes substantially equal to that of the bias voltage fed to terminal 109. The switching amplifier 108 then operates to energise the coil of the relay 110, so that the contacts 111, 111' and the contacts 112, 112' are closed. The coil of the relay 15 is energised by current which flows to chassis by way of closed contacts 12, 112' of the relay 110, closed contacts 116, 116' of the relay 117, closed contacts 103, 103' of the relay 96 and closed contacts 121, 112' of the relay 122. The contacts 118, 118' are closed and the contactor 126 is operated.

With the contactor 126 operated, all lamps in the flight deck are extinguished and the flight and engine instruments are de-energised so that their indications do not change. Simultaneously the supply of current to the motion system of the camera is interrupted so that the scene visible to the crew no longer changes and conditions similar to those which occur in the event of an actual crash are provided. In the brief interval of time between the closing of the contacts 118 and 118' and the operation of the contactor 126, the voltage fed to terminal 75 causes the height of the camera above the model to increase slightly so that the object on the model, with which the probe 21, FIG. 1, is in contact, is not damaged.

The coil of the relay 115 is energised by current which flows to chassis by way of closed contacts 112, 112', closed contacts 116, 116', closed contacts 123, 123' and closed contacts 99, 99' or 101, 101' if the simulated position of the aircraft is to the west or to the east of the runway.

Let it be assumed that the simulated aircraft is in contact with the runway and is being steered in a direction from the runway to a parking area to one side of the runway. Referring to FIGS. 2 and 3, the relays 94 to 97 and the relay 55 are not operated and the output from the rotor of the variometer unit 19 is fed to the input terminal 52 of the amplifier 53, so that the height of the viewpoint is maintained at a level above the runway which is determined by the setting of the potentiometer 61.

As the simulated aircraft leaves the runway area in a northerly or a southerly direction, the relay 96 or the relay 97 is operated and the contacts 103, 103' or the contacts 105, 105' are closed.

In this example, it is assumed that the parking area is to the south of the runway, therefore the relay 97 is operated. The relay 55 is operated and the output voltage from the rotor of the variometer unit 19 is fed to input terminal 107 or the amplifier 108, so that the relay 110 is operated. The relay 117 is not operated, since the simulated aircraft is "on ground"; hence, the relay 122 is also not operated. The contacts 112 and 112' of the relay 110 are closed, the contacts 105 and 105' of the relay 97 are closed, and the contacts 121, 121' of the relay 122 are closed, but the relay 115 is not operated because the contacts 123 and 123' of the relay 117 are open; hence, the relay 115 is not operated and conditions representative of a crash are not provided as is desired.

Let it be assumed that the simulated aircraft is in contact with the runway and is accelerating for take-off towards the easterly end of the runway. The relays 94 to 97 are not operated and the output of the rotor of the variometer unit 19, FIG. 2, is fed to the input terminal 52 of the amplifier 53, so that the height of the viewpoint is maintained at a level above the runway which is determined by the setting of the potentiometer 61.

Let it now be assumed that a simulated fault is introduced, so that the aircraft fails to accelerate sufficiently to enable it to become airborne. As the simulated aircraft overshoots the end of the runway, the relay 95 operates and the output voltage from the rotor of the variometer 19 is fed to the input terminal 107 of the amplifier 108. The value of the voltage corresponds to the height of the viewpoint above the runway, therefore the amplifier 108 is operated and the coil of the relay 110 is energised.

The coil of the relay 115 is energised by current which flows to chassis by way of closed contacts 112 and 112' of the relay 110, closed contacts 116 and 116" of the relay 17, and closed contacts 101, 101' of the relay 95. With the relay 115 operated, the contactor 126 is also operated, so that the crew are subjected to conditions which are representative of those which may occur if an aircraft overshoots the runway and is involved in a crash.

What we claim is:

1. Ground-based flight training apparatus, including apparatus for simulating visual effects corresponding to the simulated flight of an aircraft, or simulated movement of an aircraft on the ground, comprising a three-dimensional representation of the surface of the earth, a camera moved relatively to the said representation for viewing at least a portion of the said representation, a carriage attached to said camera, an electromechanical electrical signal generator mounted on said carriage, a shaft supported by said carriage and laterally displaceable relatively to said carriage, a height probe pivotally mounted on said shaft having a first arm positioned for engagement with the said representation and a second arm connected to operate said signal generator to generate a signal corresponding to the displacement of the first arm of said height probe after said engagement, means for generating a constant value signal corresponding to the displacement of the first arm of said height probe after said engagement, means for generating a constant value signal corresponding to a predetermined height representative of the pilot's eye level height when the aircraft is on the ground, comparison means for comparing the constant value signal with the signal corresponding to displacement of the said first arm of the height probe, means for limiting the relative approach of the camera to the representation when the signals are equal, a contact probe pivotally mounted on said shaft, said contact probe carrying a bar dimensioned correspondingly to the wingtip span of the aircraft and positioned correspondingly to the aircraft wings relatively to the said representation according to said relative movement of the camera, and to displace said shaft relatively to said carriage upon engagement of said contact probe with an object provided in the representation, thereby to move the second arm of said height probe in the sense to control the said signal generator for generating a signal corresponding to a reduced aircraft height.

References Cited

UNITED STATES PATENTS

| 2,883,763 | 4/1959 | Schaper | 35—12 |
| 2,959,779 | 11/1960 | Miller et al. | 35—12 X |
| 2,979,832 | 4/1961 | Klemperer | 35—12 |

MALCOLM A. MORRISON, *Primary Examiner.*

R. W. WEIG, *Assistant Examiner.*